3,305,698
ELECTRIC MOTOR OVERHEATING
PROTECTION CIRCUIT
David W. Bargen, Scottsdale, and Bradford O. Van Ness, Phoenix, Ariz., assignors to Motorola, Inc., Chicago, Ill., a corporation of Illinois
Filed Sept. 16, 1963, Ser. No. 309,155
7 Claims. (Cl. 317—13)

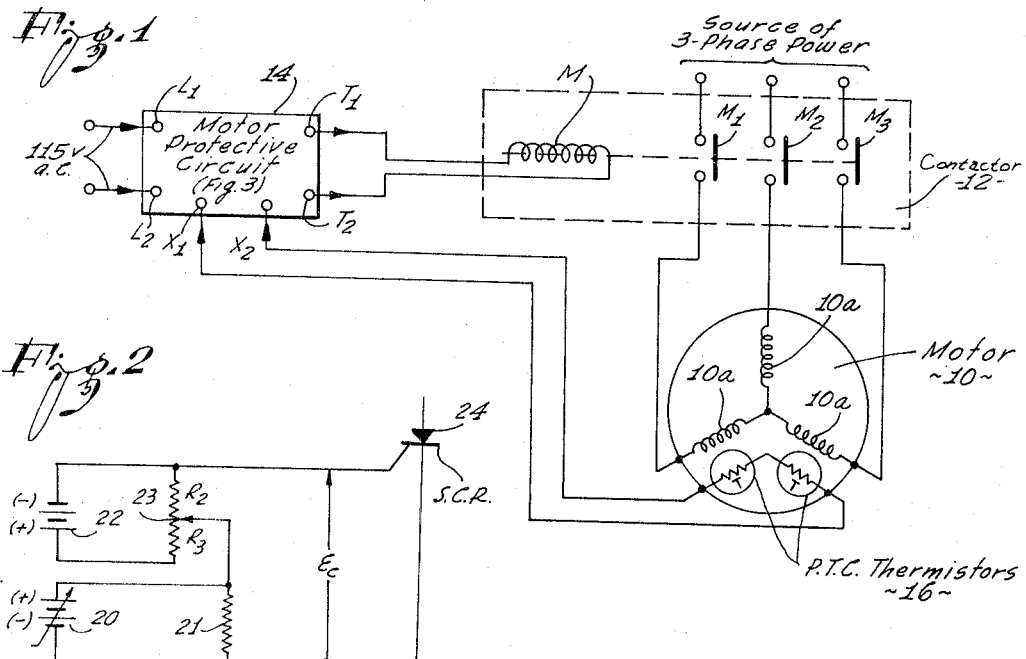
Fig. 1
Fig. 2
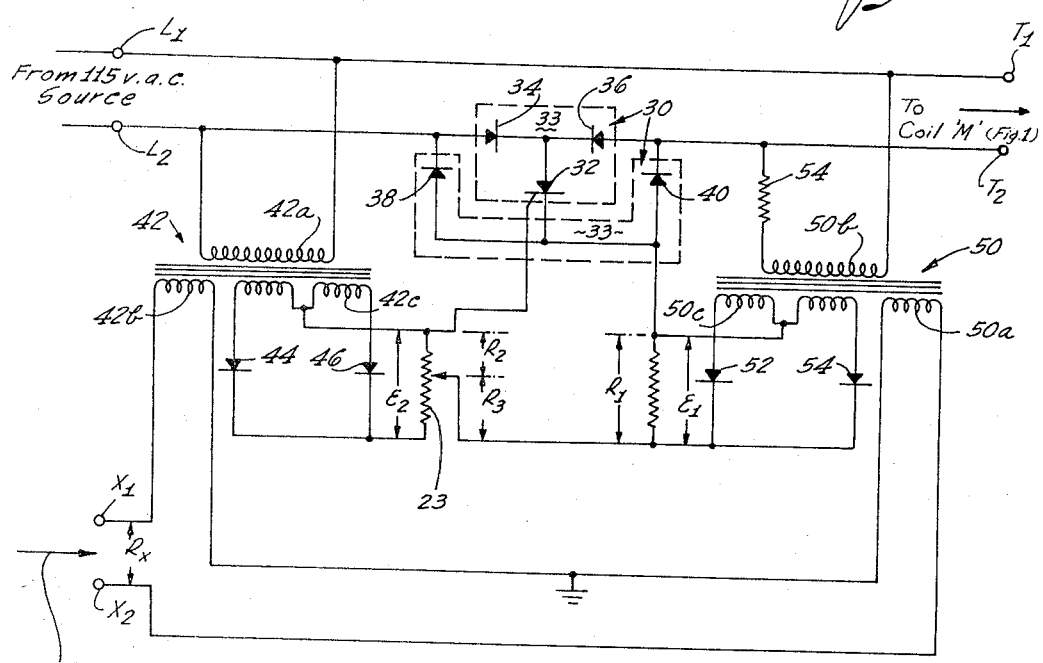
Fig. 3
INVENTORS:
David W. Bargen
Bradford O. Van Ness
Attorney United States Patent Office 3,305,698
Patented Feb. 21, 1967

The present invention is concerned with electric control circuits and the like; and it is particularly directed to control circuits which are particularly adapted for use in conjunction with positive temperature coefficient thermistors to serve as a protective means for electric motors, and other electrical equipment.

The control circuit of the present invention is of the same general type as the circuit described in copending application of David W. Bargen and Bradford O. Van Ness, Serial No. 302,409, filed August 15, 1963, now Patent No. 3,263,158.

As described in the copending application, it is usual in the prior art to provide circuits for protecting electric motors, and other electrical equipment, from overheating. These prior art protective circuits usually include thermal overload relays. However, they are not entirely satisfactory, primarily because the thermal characteristics of the relay usually do not match the thermal characteristics of the electric motor, or other equipment, which is to be protected.

Recent developments in the prior art have led to the provision of protective circuits for electric motors, and the like, which include elements that respond directly to the heat dissipated from the motor windings to produce their corresponding control effect. This latter type of prior art protective circuit has proven to be more satisfactory than the earlier thermal type of system.

The improved type of prior art protective circuit referred to in the preceding paragraph utilizes positive temperature coefficient thermistors as the temperature sensing elements. Positive temperature coefficient thermistors are presently available, and such thermistors exhibit characteristics which render them particularly suited for use in protective circuits.

The above mentioned positive temperature coefficient thermistor exhibits a relatively small resistance change for variations in the temperature to which it is exposed, so long as these temperature variations remain in a range corresponding to normal running conditions of the motor. However, the characteristics of the positive temperature coefficient thermistor are such that it exhibits a relatively large change in resistance for abnormal temperature variations above the normal running conditions of the motor.

An advantage exhibited by protective circuits utilizing the above mentioned positive temperature coefficient thermistors, is that they are capable of responding accurately and quickly to temperature increases of the protected equipment above the range normal to that equipment. Also, the positive temperature coefficient thermistor exhibits "fail safe" characteristics, in that an open circuit condition corresponds to the positive temperature coefficient thermistor in its high resistance state, which (as noted) is indicative of the abnormal condition.

It will become evident as the present description proceeds that the improved control circuit of the present invention is particularly suited for use with positive temperature coefficient thermistors in a protective circuit for electrical equipment, such as electric motors. The control circuit of the invention will be described herein as utilized in a protective circuit for an electric motor, and one which utilizes positive temperature coefficient resistive sensing elements.

It is to be understood, however, that the improved control circuit to be described and claimed herein has general utility in the control and/or protection of electrical equipment. It will also become evident that although the circuit of the invention is particularly adapted for use with positive temperature thermistors, the control circuit may be used with other types of transducer or sensing elements, which exhibit positive or negative coefficients, so long as the particular transducer is capable of transforming a monitored condition into an electrical resistance variation.

A general object of the invention, therefore, is to provide an improved circuit for producing a control effect in response to resistance variations of a sensing element.

Another object of the invention is to provide such an improved control circuit which utilizes solid state elements and which does not require mechanically controlled or moving parts in order to produce its control effect.

A still further object of the invention is to provide such an improved control circuit which exhibits a degree of electronic "hysteresis" in that a desired response lag is provided between the "pull-in" and "drop-out" operational modes of the control circuit.

Another object of the invention is to provide such an improved circuit in which the control circuitry for the solid state elements may operate at relatively low voltage and are isolated from the line voltage and from the controlled load.

Another object of the invention is to provide an improved solid state control circuit which is relatively simple in its construction and which utilizes relatively simple and inexpensive components.

Other objects and advantages of the invention will become apparent from a consideration of the following description, when the description is taken in conjunction with the accompanying drawing, in which:

FIGURE 1 is a schematic representation, partly in block form and partly in circuit form, illustrating a typical protective arrangement for a three-phase electric motor, and which arrangement may incorporate the improved control and/or protective circuit of the present invention;

FIGURE 2 is a fragmentary circuit diagram, useful in explaining the invention, and illustrating some of the basic circuit principles upon which the invention is predicated; and FIGURE 3 is a circuit diagram of one embodiment of the improved control circuit of the present invention.

The arrangement shown in FIGURE 1 includes a motor 10 which is shown schematically, and which is assumed to be a three-phase motor. The motor 10 is shown as including three Y-connected field windings 10a. Three-phase power is supplied to the field windings 10a of the motor 10 from an appropriate source of three-phase power, and through a contactor 12. The contactor 12 includes an actuating coil M, and respective normally-open contacts $M_1$, $M_2$ and $M_3$ in the three power lines.

Under normal operating conditions of the system, the coil M is energized, and it holds the contacts $M_1$, $M_2$ and $M_3$ closed, so that the power is supplied to the motor 10. However, under abnormal conditions, the energizing current to the coil M is interrupted, and the contacts $M_1$, $M_2$ and $M_3$ are opened, so as to de-energize the motor 10.

The energizing current for the contactor coil M is derived from a usual 115 volt, 230 volt, or 460 volt alternating-current source, and this current is passed through a motor protective circuit 14. The motor protective circuit 14 may, as mentioned above, be constructed to incorporate the concepts of the present invention.

The motor protective circuit 14 has a pair of input terminals $L_1$ and $L_2$ which are connected to the 115 volt alternating-current source. The circuit 14 also includes a pair of output terminals $T_1$ and $T_2$ which are connected to the contactor coil M. The motor protective circuit 14 also includes a pair of control terminals $X_1$ and $X_2$.

In the protective arrangement of FIGURE 1, one or more positive temperature coefficient thermistors 16 are embedded in the motor 10 adjacent to field windings 10a. The thermistors 16 are connected in series, and across the control terminals $X_1$ and $X_2$.

As mentioned above, under normal operating conditions of the motor 10, the temperature of the field windings 10a is such that the thermistors 16 exhibit a relatively low resistance. However, should the temperature of any one winding 10a increase to an abnormal level the resistance of the corresponding thermistors 16 increases sharply, and this increased resistance value is exhibited across the control terminals $X_1$ and $X_2$.

It will be appreciated that the thermistors 16 have a "fail-safe" characteristic, in that if an open circuit should occur, the resulting effect across the terminals $X_1$ and $X_2$ is such that the motor 10 is de-energized.

The basic concept of the motor protective circuit and/or control circuit 10 of the present invention may be understood by a consideration of the fragmentary circuit diagram of FIGURE 2. In the circuit of FIGURE 2, a potential source 20 has its positive terminal connected to the center arm of a balancing potentiometer 23. This potential source is variable as the result of net resistance changes of the P.T.C. thermistors 16 as shown in FIGURE 1 in a sense of increasing potential value for a decreasing P.T.C. resistance value. A reference potential source 22 is connected across the extremities of the balancing potentiometer 23, comprising resistances $R_2$ and $R_3$ with polarities as shown. Resistor 21 serves as a load resistance for the variable source 20. An output voltage $E_c$ is derived from the negative terminal of the reference source 22 and the negative terminal of the variable source 20, being connected to the gate electrode and the cathode electrode of silicon controlled rectifier 24, respectively.

In a manner to be described, the silicon controlled rectifier 24 is normally held conductive by a positive bias potential on its gate electrode. This permits current to flow from the input terminals $L_1$, $L_2$ to the output terminals $T_1$, $T_2$ of the circuit 14 in FIGURE 1, so as to energize the coil M of the contactor 12. However, upon the happening of an abnormal condition, which creates a temperature rise in any one of the windings of the motor 10 above the normal temperature range, the bias on the gate electrode of the rectifier 24 swings negative and the silicon controlled rectifier becomes non-conductive. This causes the current through the coil M to be interrupted, so that the contactor contacts $M_1$, $M_2$ and $M_3$ are opened.

The balancing potentiometer 23 is adjusted so that for a particular net resistance, referred to as the "critical" value, of thermistors 16 corresponding to the abnormal temperature condition where de-energization of the motor 10 is desired the voltage produced across the $R_2$ portion of the potentiometer is just equal to the voltage developed by the variable potential source 20. Since the potential sources 20 and 22 are connected in series opposition with respect to polarities, the net control voltage $E_c$ will be zero. At or close to this point, depending on the particular characteristics of the silicon controlled rectifier 24, this device will cease to conduct causing removal of power to the motor 10.

At net thermistor resistances below the "critical" value, the voltage source 20 will be greater than that proportion of reference source 22 developed across $R_2$ of the potentiometer 23; the effective gate electrode voltage of the silicon controlled rectifier 24 is positive with respect to the cathode, permitting conduction of this device. For net thermistor resistances above the "critical" value caused, for example, by thermal inertia of the machine after power is removed, the voltage source 20 will be less than that proportion of reference source 22 developed across $R_2$ of potentiometer 23. The effective gate electrode voltage of the silicon controlled rectifier 24 becomes negative, which continues to inhibit conduction of this device and prevents energization of the motor 10.

The adjustment of the arm of the potentiometer 23 determines the point at which the silicon controlled rectifier 24 will be rendered non-conductive, and thereby serves as a setting adjustment for the circuit.

It is apparent that devices having a negative resistance-temperature characteristic could be used for thermistors 16 if both potential sources 20 and 22 are reversed in polarity. Also, the arrangement of sources 20 and 22, resistor 21, and potentiometer 23 may be re-arranged in various circuit configurations to produce identical results as obtained in FIGURES 2 and 3.

As mentioned above, the circuit of FIGURE 3 represents one embodiment of the control and/or protective circuit of the present invention. In the circuit of FIGURE 3, the input terminals $L_1$ and $L_2$ are connected through a switching device 30 to the output terminals $T_1$ and $T_2$. The switching device 30 includes a silicon controlled rectifier 32 and an associate diode bridge 33.

The diode bridge 33 includes a first diode 34 having its cathode connected to the anode of the silicon controlled rectifier 32 and having its anode connected to the input terminal $L_2$; and a second diode 36 having its cathode connected to the anode of the silicon controlled rectifier 32, and having its anode connected to the output terminal $T_2$. The diode bridge 33 also includes a pair of diodes 38 and 40 having their anodes connected to the cathode of the silicon controlled rectifier 32, and having their cathodes connected to the anodes of respective ones of the diodes 34 and 36.

The solid state switching device 30 described above serves to pass the alternating current from the terminals $L_1$, $L_2$ to the terminals $T_1$, $T_2$ when the silicon controlled rectifier 32 is conductive, and to block the alternating current when the silicon controlled rectifier 32 is non-conductive. It will be appreciated that when the silicon controlled rectifier 32 is conductive, a path is established for the positive half-cycle of the alternating current through the diode 34, through the silicon controlled rectifier 32 and through the diode 40; and for the negative half-cycle through the diode 38, through the silicon controlled rectifier 32 and through the diode 36. However, when the silicon controlled rectifier 32 is rendered non-conductive, it is obvious that the path for both the negative and positive half-cycles of the alternating current is opened.

The control circuit of FIGURE 3 includes a first transformer 42 having a primary winding 42a connected to the input terminals $L_1$ and $L_2$. The transformer 42 also has a first secondary winding 42b and a second secondary 42c. A pair of diodes 44 and 46 are connected to the extremities of the secondary winding 42c to provide a rectifying circuit. The cathodes of these diodes are connected to one side of the potentiometer 23 referred to in conjunction with FIGURE 2, and the other side of the potentiometer 23 is connected to an intermediate tap on the secondary winding 42c. The rectifying circuit produces, therefore, an unfiltered unidirectional potential across the potentiometer 23 with the negative terminal of the potentiometer 23 connected to the gate electrode of the silicon conrolled rectifier 32, as in the circuit of FIGURE 2.

The control circuit of FIGURE 3 also includes a second transformer 50. The transformer 50 includes a first primary winding 50a and a second primary winding 50b. The transformer 50 also includes a secondary winding 50c.

The primary winding 50a of the transformer 50 is connected back to the secondary winding 42b of the transformer 42, the latter connection being through the control terminals $X_1$ and $X_2$, across which the thermistors 16 of FIGURE 1 are connected as a series string. One side of the connection between the two windings 42b and 50a can be grounded, as shown. However, if so desired, the entire circuit may be floating.

A pair of diodes 52 and 54 have their anodes connected to the extremities of the secondary winding 50c, and the resistance $R_1$ referred to in conjunction with FIGURE 2 is connected between an intermediate tap on the winding 50c and the cathodes of these diodes. As before, a pulsating positive unidirectional potential is produced across the resistor $R_1$. The resistor $R_1$ is connected to the movable arm of the potentiometer 23 and to the cathode of the silicon controlled rectifier 32.

Therefore, as explained in conjunction with FIGURE 2, the circuit of FIGURE 3 provides two series-connected potential sources of opposite polarity for controlling the silicon controlled rectifier 32. Under normal circumstances, the resistance $R_x$ of the thermistors 16 is relatively low, so that a relatively high positive bias is applied to the gate of the silicon controlled rectifier 32 by action of diodes 52 and 54. This causes the silicon controlled rectifier 32 to be conductive.

When the silicon controlled rectifier 32 is conductive, and as explained above, the switching device 30 permits current to flow from the terminals $L_1$, $L_2$ to the terminals $T_1$, $T_2$ so as to energize the coil M and close the contactor contacts $M_1$, $M_2$ and $M_3$.

However, an abnormal temperature rise causes the thermistor resistance $R_x$ to rise, and the bias on the gate electrode of the silicon controlled rectifier swings negative. This causes the rectifier to become non-conductive. The switching device 30 then opens, terminating the current flow through the protective circuit 10, and causing the coil M to become de-energized to open the contactor contacts $M_1$, $M_2$ and $M_3$.

It will be appreciated that when the silicon controlled rectifier 32 is conductive, so that the alternating-current can pass from the input terminals $L_1$, $L_2$ to the output terminals $T_1$, $T_2$, the resulting voltage across the output terminals causes a current to flow through the second primary 50b of the transformer 50. This current flow induces an additional voltage in the secondary 50c in a sense to aid the voltage induced by primary 50a. This additional voltage exists only when the control circuit is operating so that the coil M of FIGURE 1 is energized. This means that the resistance of the thermistors must be relatively high before the bias on the rectifier 32 will cause the rectifier to be non-conductive to enable the control circuit to enter its "drop-out" mode. When the circuit is in its "drop-out" mode there is no longer any voltage across the primary winding 50b, so that thermistor resistance must return to a relatively low value to return the rectifier 32 to its conductive state and the circuit to its "pull-in" mode. This differential between the "drop-out" and "pull-in" modes of the system is advantageous in that it prevents chatter of the contactor contacts, as is well known to the contactor art. The differential may be adjusted by selection of resistor 54 in series with primary winding 50b.

It is also to be understood that although the control circuit of FIGURE 3 is illustrated in FIGURE 1 as being incorporated in the control line of a contactor, the control circuit could be used to control the motor, or other electrical equipment directly.

Moreover, the circuit of FIGURE 3 is particularly adapted for operation with a positive coefficient resistance sensing element. By changing the polarities of the diodes 44, 46, 52 and 54, however, the circuit could be used in conjunction with a negative coefficient sensing element. It will also be appreciated, of course, that the system is not limited to temperature sensitive sensing elements. In fact, any transducer which exhibits a varying resistance in correspondence with a variation in the monitored condition can be used.

The diode bridge used in conjunction with silicon controlled rectifier 32 provides a simple and inexpensive switching device. However, if so desired, two silicon controlled rectifiers, connected in opposite directions, could be used. It is also to be noted that the circuit of FIGURE 3 operates efficiently and completely satisfactorily without the need of filtering the various waveforms. The transformers 42 and 50 provide a desired isolation for the control circuitry for the silicon controlled rectifier 32, and this circuitry can operate at low voltages, independent of the line voltage.

The invention provides, therefore, an improved and simplified motor control circuit having no mechanically moving parts. The improved control circuit of the present invention uses solid state switching devices, and it responds accurately to resistance variations of an associated sensing element, to perform its control and/or protective function.

While a particular embodiment of the invention has been shown and described, modifications may be made, and it is intended in the claims to cover such modifications which fall within the scope of the invention.

What is claimed is:

1. An electric control circuit including in combination: input terminal means for connecting the control circuit to a source of alternating current voltage; output terminal means; circuit means including a switching device coupled to said input terminal means and to said output terminal means; said switching device having a first conductive state whereby said alternating current voltage is applied to said output terminal means and a second non-conductive state; a first transformer having a primary winding connected to said input terminal means and having a first secondary winding and a second secondary winding; a second transformer having first primary winding connected to said output terminal means and having a second primary winding and a secondary winding; a variable resistance sensing element; a pair of control terminals coupled to said variable resistance sensing element; circuit means including said control terminals for connecting said first secondary winding of said first transformer, said second primary winding of said second transformer and said variable resistance sensing element in series; first rectifying circuit means connected to said second secondary winding of said first transformer and to said switching device for producing a first control signal of a polarity to render said switching device non-conductive; and second rectifying circuit means connected to said secondary winding of said second transformer and to said first rectifying circuit means; said second rectifying means producing a second control signal of a polarity to counterbalance said first control signal and render said switching device conductive only when the resistance of the sensing element varies beyond a predetermined value.

2. The control circuit defined in claim 1 in which said first rectifying circuit means includes a potentiometer having a movable arm connected to said second rectifying circuit means.

3. The control circuit defined in claim 1 and which includes an electrical impedance element connected in series with said first primary winding of said second transformer.

4. The control circuit according to claim 1 and further including an electric motor coupled to said output terminals and having windings therein, said variable resistance sensing element being mechanically coupled to said motor windings for sensing the temperature thereof, said variable resistance being responsive to said motor winding temperature to change the resistance of said variable resistance sensing element in response to changes in said motor winding temperature.

5. The control circuit defined in claim 4 wherein said variable resistance sensing element has a positive temperature coefficient.

6. The control circuit according to claim 4 wherein said switching device includes a diode bridge, having first and second pairs of opposite corners, said input terminal means and said output terminal means being coupled to separate ones of said first pair of diode bridge corners, a silicon controlled rectifier having an anode electrode coupled to one corner of said second pair of diode bridge corners, a cathode electrode coupled to the other corner of said second pair of diode bridge corners and a control electrode, and control circuit means coupling said first rectifying circuit means to said control electrode.

7. An electric control circuit including in combination, input terminal means for connecting the control circuit to a source of alternating current voltage, output terminal means, circuit means including a switching device coupled to said input terminal means and to said output terminal means, said switching device having a first conductive state whereby said alternating current voltage is applied to said output terminal means and a second non-conductive state, a variable resistance sensing element including a pair of control terminals, first rectifying circuit means coupled to said input terminals and to said switching device for producing a first control signal of a polarity to cause said switching device to assume said second state and become non-conductive, second rectifying circuit means coupled to said output terminals and to said first rectifying circuit means, a series circuit including means coupled to said input terminal means, said variable resistance means and said second rectifying means, said second rectifying circuit means being responsive to the alternating current voltages at said input, an output terminal means to produce a second control signal and apply the same to said first rectifying means, said second control signal acting to counterbalance said first control signal and render said switching device conductive only when the resistance of said variable resistance sensing element varies beyond a predetermined value.

References Cited by the Examiner
UNITED STATES PATENTS 3,032,690   5/1962   Elliot.
3,071,718   1/1963   Gordon.
3,225,280   12/1965   Happe et al. _____ 317—41 X MILTON O. HIRSHFIELD, *Primary Examiner.*

R. V. LUPO, *Assistant Examiner.*